United States Patent [19]
Lee et al.

[11] Patent Number: 5,396,622
[45] Date of Patent: Mar. 7, 1995

[54] EFFICIENT RADIX SORTING SYSTEM EMPLOYING A DYNAMIC BRANCH TABLE

[75] Inventors: Paul K. Lee, San Jose, Calif.; Zvi Y. Yehudai, Haifa, Israel

[73] Assignee: International Business Machines Corporation, Armonk, N.Y.

[21] Appl. No.: 813,246

[22] Filed: Dec. 23, 1991

[51] Int. Cl.⁶ .............................................. G05F 7/08
[52] U.S. Cl. .................................. 395/600; 395/700; 395/650; 395/800; 395/200; 364/222.9; 364/962.3; 364/DIG. 1
[58] Field of Search ............... 395/600, 800, 700, 400, 395/650

[56] References Cited

U.S. PATENT DOCUMENTS

| | | | |
|---|---|---|---|
| 4,575,798 | 3/1986 | Lindstrom et al. | 364/300 |
| 5,142,687 | 8/1992 | Lary | 395/800 |
| 5,175,857 | 12/1992 | Inoue | 395/800 |
| 5,206,947 | 4/1993 | Edem et al. | 395/600 |
| 5,218,700 | 6/1993 | Allenbeechick | 395/700 |
| 5,237,678 | 8/1993 | Kuechler et al. | 395/600 |

FOREIGN PATENT DOCUMENTS

0244958 11/1987 European Pat. Off. ........ G06F 7/36

OTHER PUBLICATIONS

Robert Sedgewick, *Algorithms*, Addison–Wesley Publishing Co (Reading, 1983) pp. 115–124.
Donald E. Knuth, *The Art of Computer Programming* vol. 3: *Sorting & Searching*, Addison Wesley (Reading, Mass., 1973) pp. 78–79.

*Primary Examiner*—Thomas G. Black
*Assistant Examiner*—Paul R. Lintz
*Attorney, Agent, or Firm*—Baker, Maxham, Jester & Meador

[57] ABSTRACT

In a recursive distributive sort of records according to their key fields, a method for distributing keys to form one or more subgroups and collecting them to preserve or maintain an order among the subgroups. The distribution is accomplished by comparing each key field against an extrinsic attribute and then assigning the key to a subgroup or bucket. The collection sequence preserves the overall key field order. A Dynamic Branching Table (DBT) for governing the ordering of buckets during the collection phase is initially populated with NO-OP instructions. During the distribution phase, a CALL instruction replaces the NO-OP in the sorted order DBT position upon the first occurrence of a distinguishable character in the key character sequence being scanned. An address pointer, pointing to the corresponding bucket, is then inserted in a Bucket Pointer Table (BPT) indexed to the DBT. During the collection phase, the DBT is executed and the empty buckets are skipped by NO-OP execution, while the populated buckets are processed by subroutine CALL execution.

6 Claims, 15 Drawing Sheets

```
MsbRadix(InputBucket,Rank,OutputBucket)
  While (not end-of-InputBucket)            /* distribution */
    fetch next RR(key,record address);
    move RR(key,record address) to OutputBucket[key[rank]];
    set DynamicBranchTable[rank,key[rank]] to X'0523';
    put OutputBucket[key[rank]] address in
        BucketPointerTable[rank,key[rank]]
  end;
  Execute DynamicBranchTable;               /* skip empty buckets */
  for (every non-empty OutputBucket[B])
    call subrtn(ReturnAddress,Rank);        /* recursive processing */
  return;

Subrtn(ReturnAddress,Rank)
  Fetch OutputBucket[B];

If (Rank > KeyLength) then                /* last key byte found */
    move all input records to the output area
        using input record address in RR;
    return;

If (OutputBucket holds a single record) then  /* early stop */
    move the input record to the output area
        using input record address in RR;
    return;

For (every non-empty OutputBucket[B])         /* recursive dist */
    MsbRadix(OutputBucket[B],Rank+1,NewOutputBucket)
```

FIG. 6

| Method | No DBT | | WITH DBT | | | |
|---|---|---|---|---|---|---|
| structure | BPT | freq | BPT | freq | DBT | freq |
| During Distribution Pass | STORE | x | STORE | x | STORE | x |
| During Empty Bucket Check | COMPARE<br>BRANCH | 256-x<br>256-x | - - - | | NOP | 256-x |
| During Non-Empty Bucket Check | COMPARE<br>LOAD<br>STORE<br>BRANCH | x<br>x<br>x<br>x | LOAD<br>STORE | x<br>x | STORE | x |
| # INST<br>#NO-OP | 512+3x | | 3x | | 2x<br>256-x | |
| # INST<br>#NO-OP | 512+3x | | 5x<br>256-x | | | |

X = NUMBER OF NON-EMPTY BUCKETS

*FIG. 10*

Record (1) = AA503
Record (2) = BB087
Record (3) = CC512
Record (4) = DD061
Record (5) = EE908
Record (6) = FF170
Record (7) = GG897
Record (8) = HH653
Record (9) = II154
Record (10) = JJ504
Record (11) = KK060

*FIG. 11*

Input Bucket

72 → B1: | B2 | 0 | / | 503 | @R1 | / | 087 | @R2 |
B2: | B3 | 0 | / | 512 | @R3 | / | 061 | @R4 |
B3: | B4 | 0 | / | 908 | @R5 | / | 170 | @R6 |
B4: | B2 | 0 | / | 897 | @R7 | / | 653 | @R8 |
B5: | B6 | 0 | / | 154 | @R9 | / | 504 | @R10 |
B6: | 0 | 1 | / | 060 | @R11 | / | unused |

*FIG. 12B*

|  | RANK → | | | | | |
|---|---|---|---|---|---|---|
| KEY BYTE VALUE | DBT(1) | DBT(2) | DBT(3) | BPT(1) | BPT(2) | BPT(3) |
| 0 | NO-OP | NO-OP | NO-OP | 0 \| 0 | 0 \| 0 | 0 \| 0 |
| 1 | NO-OP | NO-OP | NO-OP | 0 \| 0 | 0 \| 0 | 0 \| 0 |
| 2 | NO-OP | NO-OP | NO-OP | 0 \| 0 | 0 \| 0 | 0 \| 0 |
| ⋮ | ⋮ | ⋮ | ⋮ | ⋮ | ⋮ | ⋮ |
| 255 | NO-OP RETURN | NO-OP RETURN | NO-OP RETURN | 0 \| 0 | 0 \| 0 | 0 \| 0 |

*FIG. 12A*

| KEY BYTE VALUE | DBT(1) | BPT(1) | |
|---|---|---|---|
| 0 | Call Subroutine | B8 | B14 |
| 1 | Call Subroutine | B10 | B10 |
| 2 | No-Operation | 0 | 0 |
| 3 | No-Operation | 0 | 0 |
| 4 | No-Operation | 0 | 0 |
| 5 | Call Subroutine | B7 | B13 |
| 6 | Call Subroutine | B12 | B12 |
| 7 | No-Operation | 0 | 0 |
| 8 | Call Subroutine | B11 | B11 |
| 9 | Call Subroutine | B9 | B9 |
| ⋮ | ⋮ | ⋮ | ⋮ |
| 255 | No Operation | 0 | 0 |
|  | Return (exit distribution) | | |

*FIG. 13A*

|  | B8 | |
|---|---|---|
| Bucket(0) | B14 | 0 |
| | 087 | @R2 |
| | 061 | @R4 |

|  | B14 | |
|---|---|---|
| | 0 | 1 |
| | 060 | @R11 |
| | unused | |

|  | B12 | |
|---|---|---|
| Bucket(6) | 0 | 1 |
| | 653 | @R8 |
| | unused | |

|  | B10 | |
|---|---|---|
| Bucket(1) | 0 | 0 |
| | 170 | @R6 |
| | 154 | @R9 |

|  | B11 | |
|---|---|---|
| Bucket(8) | 0 | 1 |
| | 897 | @R7 |
| | unused | |

|  | B7 | |
|---|---|---|
| Bucket(5) | B13 | 0 |
| | 503 | @R1 |
| | 512 | @R3 |

|  | B13 | |
|---|---|---|
| | 0 | 1 |
| | 504 | @R10 |
| | unused | |

|  | B9 | |
|---|---|---|
| Bucket(9) | 0 | 1 |
| | 908 | @R5 |
| | unused | |

*FIG. 13B*

KEY BYTE VALUE ↓

| | DBT(2) | BPT(2) | |
|---|---|---|---|
| 0 | No-Operation | 0 | 0 |
| 1 | No-Operation | 0 | 0 |
| 2 | No-Operation | 0 | 0 |
| 3 | No-Operation | 0 | 0 |
| 4 | No-Operation | 0 | 0 |
| 5 | No-Operation | 0 | 0 |
| 6 | Call Subroutine | B16 | B16 |
| 7 | No-Operation | 0 | 0 |
| 8 | Call Subroutine | B15 | B15 |
| 9 | No-Operation | 0 | 0 |
| ⋮ | ⋮ | ⋮ | ⋮ |
| 255 | No Operation | 0 | 0 |
| | Return (branch to DBT(1,1)) | | |

Bucket(06)

| 0 | 0 |
|---|---|
| 061 | @R4 |
| 060 | @R11 |

B15

Bucket(08)

| 0 | 1 |
|---|---|
| 087 | @R2 |
| unused | |

*FIG. 14B*

| KEY BYTE VALUE | DBT(3) | BPT(3) | |
|---|---|---|---|
| 0 | Call Subroutine | B18 | B18 |
| 1 | Call Subroutine | B17 | B17 |
| 2 | No-Operation | 0 | 0 |
| 3 | No-Operation | 0 | 0 |
| 4 | No-Operation | 0 | 0 |
| 5 | No-Operation | 0 | 0 |
| 6 | No-Operation | 0 | 0 |
| ⋮ | ⋮ | ⋮ | ⋮ |
| 255 | No-Operation | 0 | 0 |
|  | Return (branch to (DBT(2,7)) |  |  |

| | 0 | 1 |
|---|---|---|
| Bucket(060) | 060 | @R11 |
| | unused | |

B17

| | 0 | 1 |
|---|---|---|
| Bucket(061) | 061 | @R4 |
| | unused | |

*FIG. 15B*

COLLECTION BUCKET

FIG. 16A

COLLECTION BUCKET

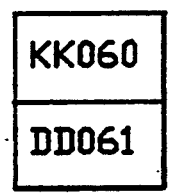

FIG. 16B

KEY BYTE VALUE 

| | DBT(2) | DBT(3) |
|---|---|---|
| 0 | No-Operation | No-Operation |
| 1 | No-Operation | No-Operation |
| 2 | No-Operation | No-Operation |
| 3 | No-Operation | No-Operation |
| 4 | No-Operation | No-Operation |
| 5 | No-Operation | No-Operation |
| 6 | No-Operation | No-Operation |
| 7 | No-Operation | No-Operation |
| 8 | Call Subroutine | No-Operation |
| ⋮ | ⋮ | ⋮ |
| 255 | No Operation | No Operation |
| | Return (branch to DBT(1,1)) | Return (branch to DBT(2,7)) |

FIG. 16C

COLLECTION BUCKET

| KK060 |
|---|
| DD061 |
| BB087 |

| KEY BYTE VALUE ↓ | DBT(2) | DBT(3) |
|---|---|---|
| 0 | No-Operation | No-Operation |
| 1 | No-Operation | No-Operation |
| 2 | No-Operation | No-Operation |
| 3 | No-Operation | No-Operation |
| 4 | No-Operation | No-Operation |
| 5 | No-Operation | No-Operation |
| 6 | No-Operation | No-Operation |
| 7 | No-Operation | No-Operation |
| 8 | No-Operation | No-Operation |
| ⋮ | ⋮ | ⋮ |
| 255 | No Operation | No Operation |
|  | Return (branch to DBT(1,1)) | Return (branch to DBT(2,9)) |

COLLECTION BUCKET

| KK060 |
|---|
| DD061 |
| BB087 |
| II154 |
| FF170 |

FIG. 18

COLLECTION BUCKET

| KK060 |
|---|
| DD061 |
| BB087 |
| II154 |
| FF170 |
| AA503 |
| JJ504 |
| CC512 |
| HH653 |
| GG897 |
| EE908 |

FIG. 19

EFFICIENT RADIX SORTING SYSTEM EMPLOYING A DYNAMIC BRANCH TABLE

BACKGROUND OF THE INVENTION

1. Field of the Invention

This invention relates to systems for distributive sorting, and more particularly, to efficient Most Significant Byte (MSB) radix sorting through Dynamic Branch Table (DBT) control of sorting bucket ordering.

2. Discussion of the Related Art

Sorting is generally acknowledged to be one of the most time consuming computer-implemented procedures. It has been estimated that over twenty-five percent (25%) of all computer running time is devoted to sorting. Many installations use over half of their available computer time for sorting. Numerous proposals and improvements have been disclosed in the art for the purposes of reducing sorting time and increasing sorting efficiency. Refer to, for instance, Harold Lorin, "Sorting and Sorting Systems", the Systems Programming Series, copyright 1975 by Addison-Wesley Publishing Company, pp. 143-66 chapter on distributive sorts and especially pp. 148-158 on digit sorting for a discussion of efficient large scale sorting methods.

The classical sorting procedure known in the art sorts a group of data records into a sequence specified by an identifying key assigned to each record. For small numbers of records, a first class of sorting procedures having minimal overhead steps unrelated to record numbers are most efficient. This first class includes the insertion, selection and bubble sorts and generally includes the simplest procedures requiring a sorting time proportional to the square of the number of records. A second class of sorting procedures are most efficient for intermediate numbers (up to 100,000) of records. This second class require sorting time proportional to $Nlog_2N$ and includes Quicksort and Heapsort, which are known in the art. A third class of sorting procedures are generally useful for very large files and require a sorting time linearly proportional to the number of records with substantial number-independent overhead. This third class includes all types of bin or bucket sorting, including radix sorting. The fixed computational overhead unrelated to the number of records makes this third class of sorts inefficient for fewer numbers of records.

The typical bucket sort employs one of two approaches. In these approaches, the distribution of records starts either according to the Least Significant Byte (LSB) or Most Significant Byte (MSB) in the key field (see the Lorin reference cited above). The only difference between these two is the key field scanning direction.

For LSB radix sorting, records are first distributed to buckets according to the LSB value in the key. After this first distribution, the LSB buckets are recombined so that the order of the LSB's is preserved. Then the records are again sequentially distributed to buckets according to the Next Least Significant Byte (NLSB) in the key. This process is repeated until the final distribution pass for the MSB, at which point the records are sorted. The primary drawback of LSB radix sorting is that it is insensitive to the data. The number of distribution passes is constant and equal to the number of bytes in the key, regardless of opportunities for short-cuts arising from the data distribution. The entire key must be scanned even if only a few of the more significant bytes are sufficient to order the records.

With MSB radix sorting, records are first distributed according to the MSB value in the key. Records with the same MSB are grouped within the same bucket. Each of the buckets can then be sorted independently of other buckets without the recombination step needed in the LSB sort. The records in the first MSB bucket are distributed again according to the second MSB. Then the records in the first bucket in the second rank having the same first two MSB's are distributed again according to the third MSB. As the distribution continues down the key ranks, the number of records having identical MSB's within a bucket becomes smaller and smaller. The records within a bucket are completely sorted when either the LSB is examined or the bucket has a single record.

This process continues recursively until all records in the first bucket in the first rank are sorted. Then the second bucket in the first rank is distributed recursively according to the second MSB, the third MSB, etc., the third bucket in the first rank is distributed and so forth.

Because many of the subsequent buckets will have one or no records, the recursive sort sequences will often terminate before LSB examination. Thus, the MSB radix sorting method exploits the data distribution and does not require a constant number of distribution passes. For some data, the MSB radix sort can be significantly more efficient than the LSB radix sort of the same records.

For MSB radix sorting, every bucket generates up to R (R=radix of key bytes=maximum number of possible values) new buckets of next rank during distribution of each key byte value in the present rank. This list of R buckets must then be sequentially scanned to find the non-empty bucket(s) for the distribution of the subsequent ranks. If the number of non-empty buckets actually encountered during the distribution is substantially less than R, then the sequential scan of the entire list of R buckets represents a significant waste of computer processing time.

In U.S. Pat. No. 4,809,158, McCauley proposes the use of an auxiliary table (his "bin used" table) to account for all byte values actually encountered during the current distribution. If the number of encountered values is less than a threshold number, McCauley then sorts the auxiliary table and uses the table entry value to index (point) into the bucket list and identify the non-empty buckets rather than sequentially scanning the entire bucket list. However, McCauley pays the price of the extra processing overhead required to accumulate and sort the auxiliary tables and to index the additional indirect addressing to the list of all possible buckets. Moreover, McCauley's procedure may not be optimally efficient for some data distributions because of the inflexibility of the threshold value he uses to trigger the optional auxiliary table sort.

Refer also to Aho, et al, "Design and Analysis of Computer Algorithms", copyright 1974 by Addison-Wesley Publishing Company, pp. 76-97 and especially pp. 79-84 regarding a radix sort of keys having unequal length using a preprocessing step to avoid the time needed to scan empty buckets. Aho, et al observed that a list of occupied buckets made during the distribution phase can be used to reduce the time necessary to link occupied buckets during the collection phase of a distributed radix sort. Although McCauley improves on Aho, et al by proposing to use such a list for scanning and linking the occupied buckets only when they are in a countably insignificant minority, McCauley's method does not avoid the additional processing overhead required to develop the auxiliary tables suggested by Aho, et al.

There is a clearly felt need in the art to increase the efficiency of sorting techniques applied to very large numbers of records. Until now, no method was known in the art for optimally and dynamically minimizing the collection phase activity in a bucket sort in accordance with an occupied bucket table accumulated during the distribution phase without additional processing overhead. This unresolved deficiency is clearly felt in the art and is solved by the present invention in the manner described below.

SUMMARY OF THE INVENTION

The present invention makes use of a Dynamic Branch Table (DBT) to process the list of all possible buckets created during each present rank key byte value distribution phase and to efficiently skip the empty buckets in this list with minimal processing overhead. The DBT is a code segment consisting of a series of executable opcodes that is constructed dynamically by the application. The DBT is initialized to contain "NO-OPERATION" (NO-OP) opcodes. When a bucket is selected according to the byte value of the present key rank, a pointer is inserted in a Bucket Pointer Table (BPT) pointing to the location of the corresponding record key fields, and a "CALL SUBROUTINE" (CALL) opcode is inserted into the DBT at the location corresponding to the present rank key byte value. A DBT entry is updated only once during each distribution phase, upon the first such selection of a bucket.

Upon completion of the present rank distribution phase, the DBT is executed sequentially from the beginning, the empty buckets are skipped by the NO-OP instructions and the populated buckets are processed by the CALL instructions. Each empty bucket is skipped by execution of a NO-OP instruction with minimal overhead (often a single clock cycle). Each occupied bucket is processed by a subroutine CALL and the corresponding DBT entry is updated again when a NO-OP opcode is written over the CALL opcode when the CALL is completed.

Thus, it is an objective of this invention to provide a method of reducing MSB radix sort processing by scanning occupied buckets only without requiring additional processing overhead to develop an auxiliary list of occupied buckets during the distribution phase. It is an advantage of this invention that the DBT can be executed without scanning all possible output buckets. It is another advantage of this invention that the execution time of a NO-OP instruction is usually much faster than the series of instructions required to check an entry in an occupied bucket list.

It is a feature of the present invention that both the DBT and BPT are initialized with default values such that no processing time is required to make the individual entries associated with empty buckets.

It is another purpose of this invention to effect available savings in sorting time arising from the characteristics of the data records. It is a feature of this invention that the bucket distribution sequences are always terminated at the singleton bucket, thereby assuring an optimally short sorting time for the particular data records being sorted.

The foregoing, together with other features and advantages of the present invention, will become more apparent when referring to the following specifications, claims and the accompanying drawings.

BRIEF DESCRIPTION OF THE DRAWINGS

For a more complete understanding of the present invention, reference is now made to the following detailed description of the embodiments illustrated in the accompanying drawings, wherein:

FIG. 6 shows a pseudo-code embodiment of the MSB radix sorting method of the present invention;

FIG. 8, comprising

FIG. 10 compares the instruction processing requirements of the prior art with that of the present invention;

FIG. 11 shows a list of data records used in a procedural example of the present invention;

FIG. 12, comprising FIGS. 12A and 12B, shows the results of the initialization steps of the procedural example;

FIG. 13, comprising FIGS. 13A and 13B, shows the results of the first distribution step of the procedural example;

FIG. 14, comprising FIGS. 14A and 14B, shows the results of the second distribution step of the procedural example;

FIG. 15, comprising FIGS. 15A and 15B, shows the results of the third distribution step of the procedural example;

FIG. 16, comprising FIGS. 16A, 16B and 16C, shows the results of the execution of the third rank DBT of the procedural example;

FIG. 17, comprising

FIG. 18 shows the results of a second round of first rank DBT executions for the procedural example; and FIG. 19 shows the final sorted data records as listed in the collection bucket of the procedural example.

DETAILED DESCRIPTION OF THE PREFERRED EMBODIMENTS

The present invention makes use of a novel Dynamic Branch Table (DBT) that is constructed dynamically by the application. The DBT is initialized to contain "no-operation" (NO-OP) instructions in an array of cells organized by key byte value within each key field byte rank. This can be best appreciated by first considering the definitions and data configuration of the fields and blocks used in an embodiment of the present invention.

Figure 1:
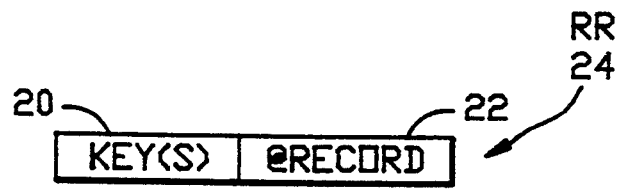
FIG. 1 shows the schematic form of a Record Representation (RR)

As is known in the art, a sorting operation can comprise the sorting of records themselves or the sorting of key fields and record identifiers alone. FIG. 1 shows a typical Record Representation (RR) 24 consisting of at least one key field 20 and a record address pointer 22, which points to the storage address of the actual data record (not shown). By using the RR format illustrated in FIG. 1, the system need only move the bytes composing the RR during the sort process rather than the entire data record.

Figure 2:
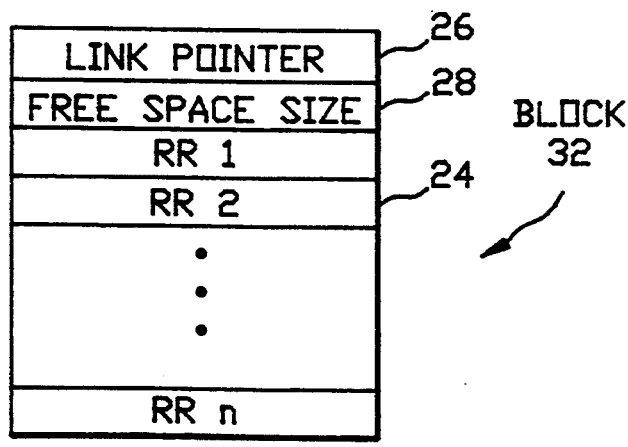
FIG. 2 shows the schematic form of a Block.

The RRs are typically organized in memory as blocks. FIG. 2 shows a typical block 32, which is a collection of a predetermined number n of RRs in a contiguous memory location. Each such block consists of the same number n of RRs, exemplified by RR 24 shown, and two header fields. A link pointer field 26 points to a subsequent block and a free space size field 28 indicates the number of empty RR locations available within the block. With link pointer field 26, non-contiguous blocks of memory can be organized to form buckets holding an indefinitely large number of RRs.

Figure 3:
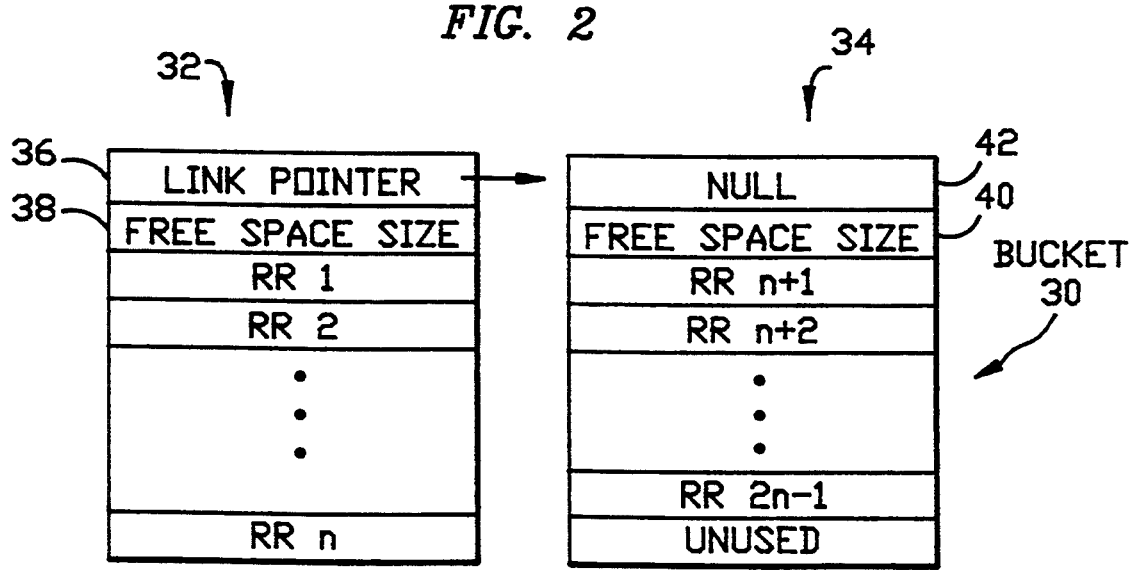
FIG. 3 shows a schematic representation of a Bucket.

FIG. 3 illustrates a typical bucket 30, which consists of a single linked list of one or more blocks. In FIG. 3, bucket 30 comprises block 32 and another block 34. Block 32 is linked to block 34 by means of link pointer field 36. Bucket 30 contains 2n—1 number of RRs as shown. Free space size field 38 shows the number of empty RR locations in block 32, which is zero in FIG. 3, and free space size field 40 shows the number of empty RR locations in block 34, which is one. Link pointer field 42 has a null entry because block 34 is the last block within bucket 30.

Figure 4:
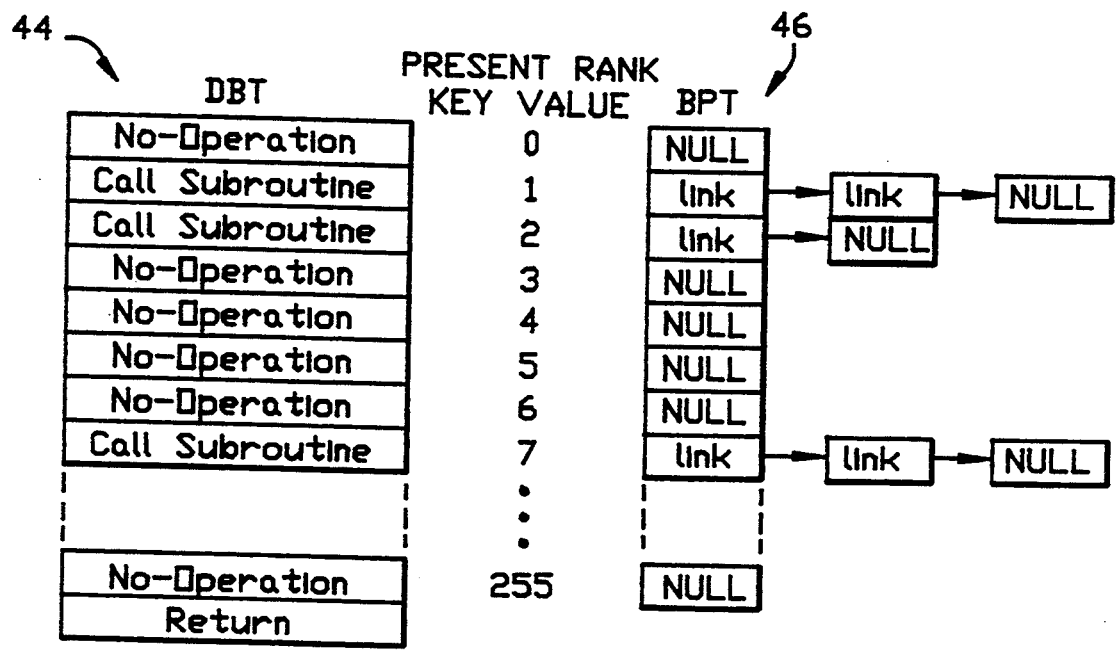
FIG. 4 shows a schematic representation of a Dynamic Branching Table (DBT) indexed to a Bucket Pointer Table (BPT)

FIG. 4 illustrates the fundamental concept of the Dynamic Branch Table (DBT). The DBT 44 is initialized to contain "no-operation" opcodes, and a distribution Bucket Pointer Table (BPT) 46 is initialized to contain NULLs (zeros). Both DBT 44 and BPT 46 are indexed by the present rank key field byte value, which spans the interval (0–255) in the example shown in FIG. 4 (assuming eight bits per byte). During distribution, when a bucket (x) is selected according to the present rank key field byte value x, a "Call Subroutine" opcode is inserted into the DBT at position x and a link pointer to bucket x is inserted in BPT at position x. Although BPT 46 position x is updated for each key byte value x encountered during distribution, DBT 44 position x is updated only once upon the first encounter of present rank key byte value x.

Referring again to FIG. 4, note that, for key byte value positions 1, 2 and 7, DBT 44 contains "CALL" opcodes. Note also that, in the same indexed positions, BPT 46 contains pointers linking to the bucket block locations containing the RRs distributed during the distribution phase of the sort. Buckets 1 and 7 are shown having two blocks linked together in the manner discussed above in connection with FIG. 3 and bucket 2 is shown having just one block. The values in FIG. 4 are chosen for illustrative purposes only.

Figure 5:
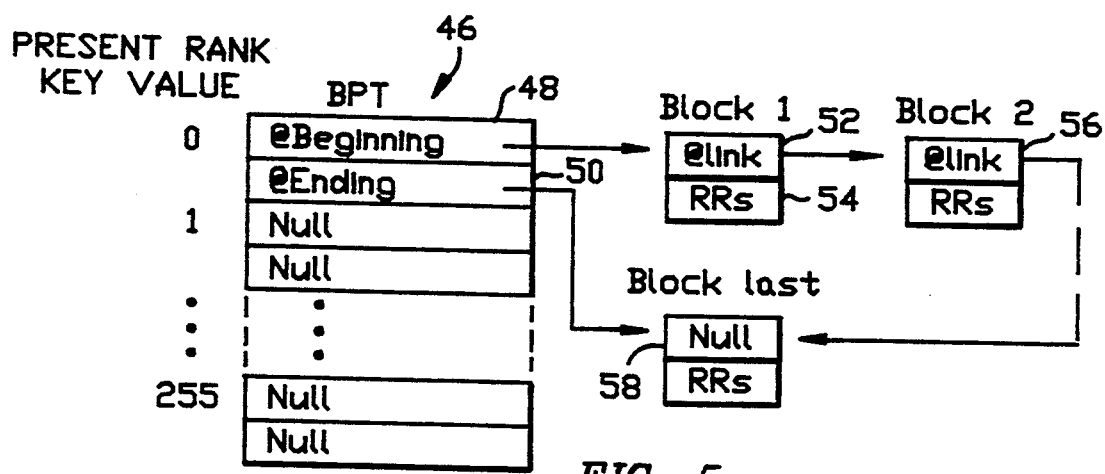
FIG. 5 shows a detailed linking scheme for a BPT.

FIG. 5 shows a preferred method for indexing BPT to the blocks making up each bucket. In FIG. 5, BPT 46 includes a beginning block address pointer 48 and an ending block address pointer 50 in each of the 256 BPT positions corresponding to the range of possible key byte values. For key byte value zero, pointer 48 refers to block 1. Block 1 comprises link pointer 52 and a list of RRs 54. Link pointer 52 points to block 2. In block 2, link pointer 56 points to the next block in bucket zero. Finally, the last block in bucket zero is shown containing a null link pointer 58. BPT ending block pointer 50 points to the beginning of the last block, which includes null link pointer 58.

This data linking technique is very useful because it permits a single bucket to be indefinitely and dynamically expanded to occupy as many or few blocks as necessary during each distribution phase of the MSB sort. As each RR is examined for its present rank key field byte value and then routed to the proper bucket, BPT 46 is updated as necessary to reflect the addition of subsequent blocks to the bucket. However, only a single update is necessary in DBT 44 (FIG. 4) for the first call to any particular bucket.

Referring to FIG. 4, note that DBT 44 is an array of branch instructions. DBT 44 is initialized to contain "NO-OP" opcodes. DBT 44 consists of a single column having present rank as shown in FIG. 4. In general, a DBT comprises a column for each rank of the key field, making up a two-dimensional array of branch instructions. Thus, any DBT entry can be considered to be indexed according to rank and value (r, v) for the entire key field. The last entry of DBT 44 is not indexed by the key byte value and is used as a return instruction. The DBT size is based on the key field byte radix. For the table illustrated in FIG. 4, the EBCDIC data standard having eight bites per byte is used for illustrative purposes. Each of the "Call Subroutine" instructions shown in DBT 44 contains means for passing an indication of the key byte value at that DBT location to the subroutine.

Referring to FIG. 5, note that BPT 46 is an array of bucket pointers. The BPT is initialized to contain NULL entries. The key byte value of each RR is used as an index to a BPT row and each BPT column represents a particular key byte rank. Each BPT entry contains the beginning block and ending block addresses of a bucket. The table size is based on the key field byte radix as with the DBT.

During a typical distribution operation, an input bucket of present rank is scanned and each RR is copied to an output bucket according to the value of the present rank key byte. After the entire input bucket has been distributed, the same procedure is invoked recursively for every non-empty output bucket. The recursive invocations of the non-empty buckets are executed in lexicographic order, which guarantees sort correctness. The sorting procedure terminates either when all bytes in the key have been examined or when only a single record remains in the output bucket.

FIG. 6 provides a PASCAL-type pseudocode implementation of the preferred embodiment of the present invention. The pseudocode is a routine for the MSB radix sort of a list of RRs contained in an input bucket. The sort is made to an output bucket according to the value of the byte at a specified rank in the key field of each RR.

Figure 7:
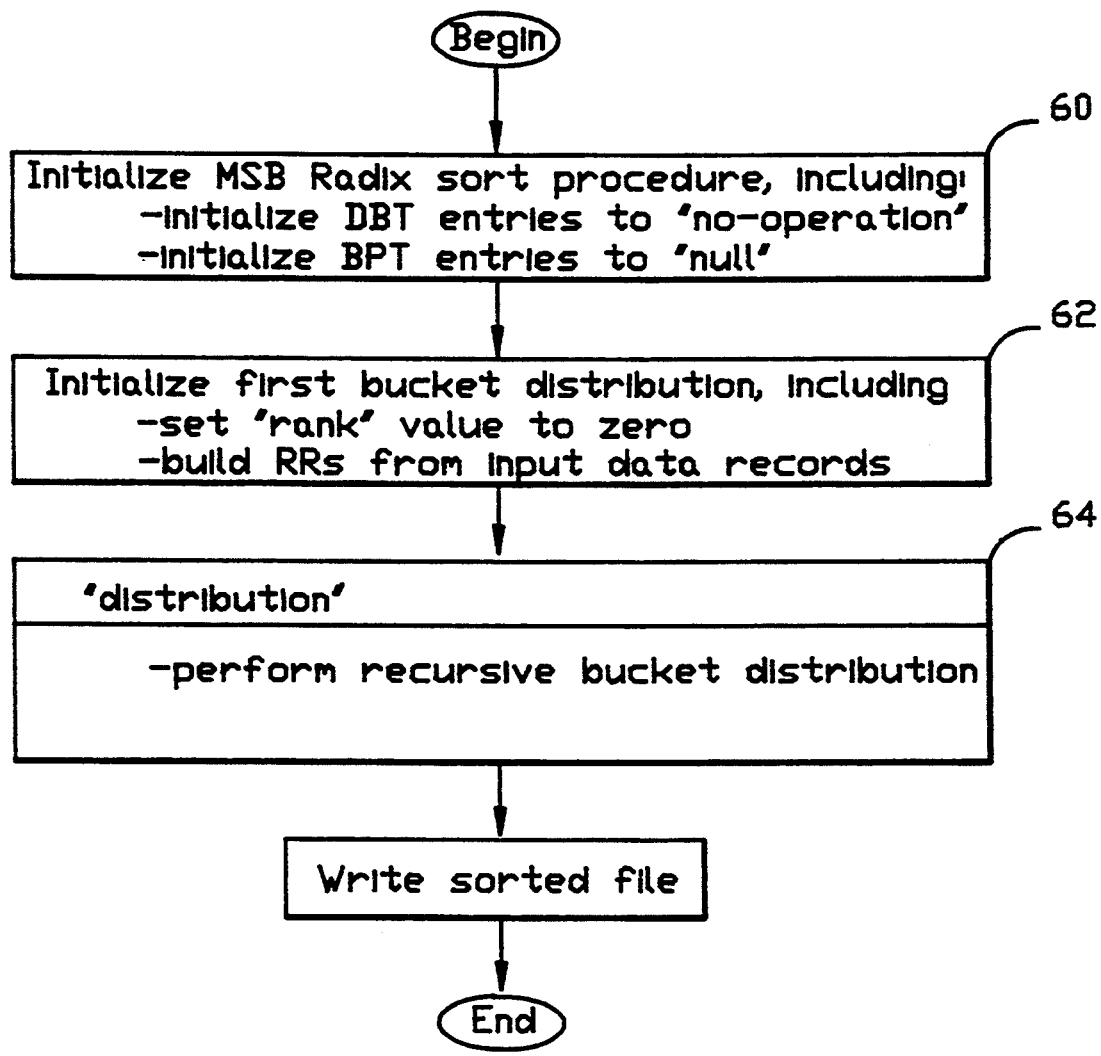
FIG. 7 shows a general flow chart of the preferred method of the present invention.

Referring to FIG. 7, the method of the present invention is illustrated in flow chart form. The first initialization step 60 comprises the creation of one Dynamic Branch Table (DBT) column and one Bucket Pointer Table (BPT) column for each byte rank of the key field. These single columns can be viewed as making up the two-dimensional arrays, DBT[r, v] and BPT[r, v], where DBT[r, v] designates the entry v within DBT table rank r. A separate DBT and BPT column pair is used for the bucket distribution in each key rank. The DBT and BPT columns for rank 1 are used for distribution on the first MSB, the DBT and BPT columns for rank 2 are used for distribution on the second MSB and so forth, as will be appreciated by referring to the procedural example set forth below.

In step 60, the DBT entries are initialized to "no-operation" OP-CODE (X'0700' or BCR 0 for IBM S-370 instruction code), and BPT entries are initialized to zero. The data records to be sorted are first read into main storage and then the Record Representations (RRs) are formed by extracting only the key fields from each record and adding a pointer to locate the original record. The extraction process includes (a) moving at least one key fields of a record to a bucket, and (b) appending the record address. Every RR is moved from input to output bucket during each distribution phase.

The block and bucket data structure discussed in connection with FIGS. 2 and 3 are significant considerations in the embodiment of this invention for the following reasons. A processor cache is an associative memory that works at very high speed and is matched to the central processor unit (CPU) speed. The cache is smaller than main memory but much faster. Least Recently Used (LRU) data and the memory neighbors are held in processor cache in anticipation of use in the near future. When the CPU references data in main storage, it first checks the cache for the data. If data is in processor cache, then it is fetched very quickly compared to the time required to fetch the data from main memory. Grouping multiple RRs within a contiguous block (as in FIG. 2) and linking blocks to form buckets (as in FIG. 3) achieves high processor cache utilization and thereby reduces CPU memory access time.

However, this preferred data structure requires additional data movement to copy every RR from input bucket to output bucket during the distribution phase. A data structure employing linked lists of records can replace data movement with simple pointer manipulation. However, the use of processor cache is thereby reduced because data is spread all over memory. Thus, there is a trade-off between data movement and improved cache use between the bucket and the linked list data structures. With smaller key fields (less data movement for smaller RRs) or larger data storage sizes (more records, with adverse effect on cache utilization), the bucket data structure is preferred to the linked list data structure.

Referring again to FIG. 7, the second initialization step 62 is next performed for the first bucket distribution. All RRs are built and grouped into a single input bucket (not shown) having multiple blocks linked together (see FIG. 3). This bucket will be first distributed according to the values of the MSB of the key field. For subsequent bucket distributions, the bucket pointers will be fetched from the present rank of the BPT.

The distribution phase of the present invention is shown in FIG. 7 as distribution step 64 and is illustrated in detail in FIG. 8. The input bucket records are distributed to different output buckets according to their key field byte value. The BPT is employed to keep track of the beginning and end of these output buckets. The ending address entry of BPT[r, v] is used to determine if the corresponding output bucket is empty or in use. If the ending address entry is not zero, it indicates that the corresponding output bucket is not empty. If the output bucket is not empty, the ending address or last block address is fetched and a test is made to determine if the last block has enough room for the current RR. This test is done by subtracting the free space size field from the RR size. If there is enough room, then the current RR is copied from the input bucket to the next available space within the block. If there is not enough room, then a new block is allocated. The new block is added to the corresponding output bucket by writing the new block address into the link field of the previous block to form a linked block list. The ending address entry of BPT[r, v] is then updated with the new block address to reflect the new last block location for the output bucket. If the output bucket is empty, the beginning and ending pointers in BPT[r, v] are then updated with the new block address to reflect that the output bucket is now in use. The DBT[r, v] entry is also updated with "call subroutine" opcode (X'0523'=BALR 2, 3 for IBM S/370 instruction code). When the current RR has been moved from the input bucket to the new block, the free space size field in the new block is updated.

Thus, the first occurrence of a unique key byte value in the present rank will cause the entry of DBT[r, v] to be replaced by a "call subroutine" opcode and the entry of BPT[r, v] to be replaced by the output bucket address pointers.

Figure 8A:
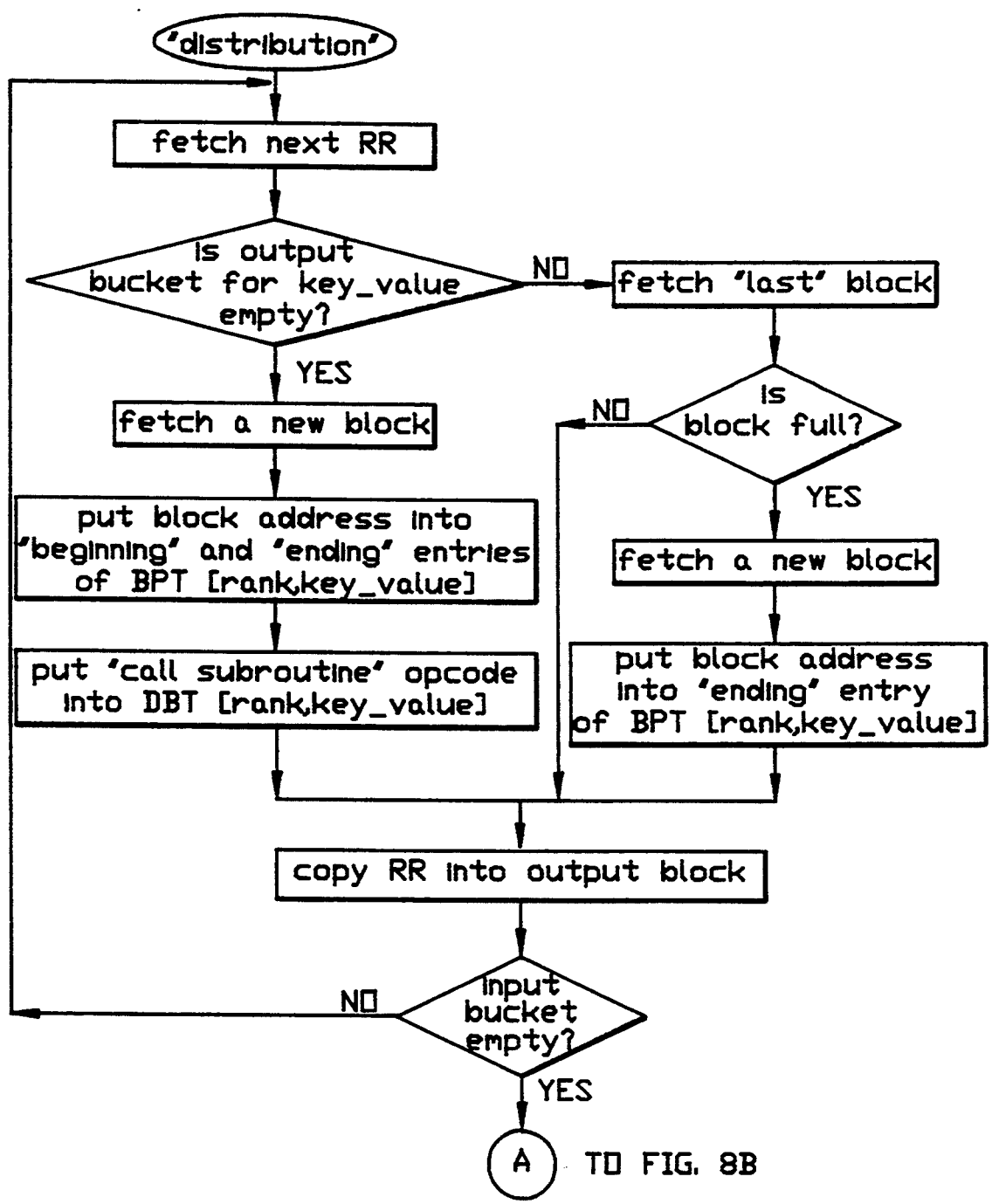
FIGS. 8A and 8B, shows a flow chart illustrating the distribution method of the present invention.

The distribution process repeats for all RRs in the input bucket and may be appreciated by referring to FIG. 8A.

Once all RRs in the input bucket have been distributed into different output buckets according to the key MSB value, each of the output buckets contains RRs having the same key MSB value. For each key rank distribution, an input bucket generates up to 256 (0–55 range of values) output buckets. Each of the non-empty output buckets is again distributed in ascending order according to the Next MSB key value. This process continues recursively down the rank to the LSB of the key field and can be appreciated by referring to FIGS. 8B and 9.

The BPT contains the pointers for all non-empty output buckets and NULL entries for the empty output buckets. The BPT normally must be sequentially scanned to find the non-empty output buckets for distribution based on the next ranking key field byte value. If the number of values actually countered during the distribution is substantially less than the maximum number of possible values, then the sequential scan of the BPT is unnecessary and can be avoided. The method of the present invention employs the DBT to process the BPT during each distribution, thereby efficiently skipping the empty buckets with minimal processing overhead associated.

Figure 8B:
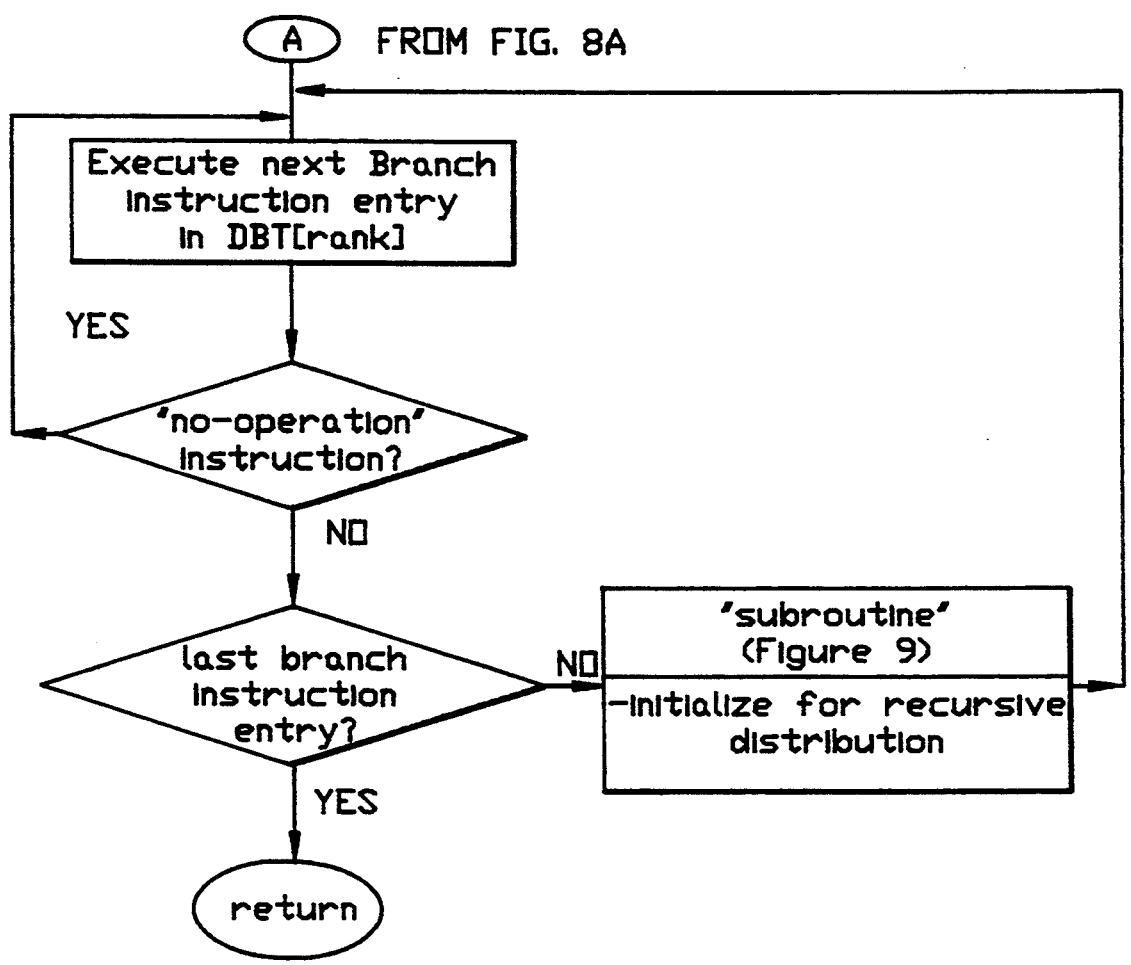

Referring to FIG. 8B, upon completion of the input bucket distribution, DBT is executed sequentially from the beginning. For empty output buckets or non-occurrence of a key field byte value, a NO-OP instruction is quickly and efficiently executed. For non-empty output buckets or the occurrence of a unique key field byte value, a predefined subroutine is executed through the CALL instruction.

Figure 9:
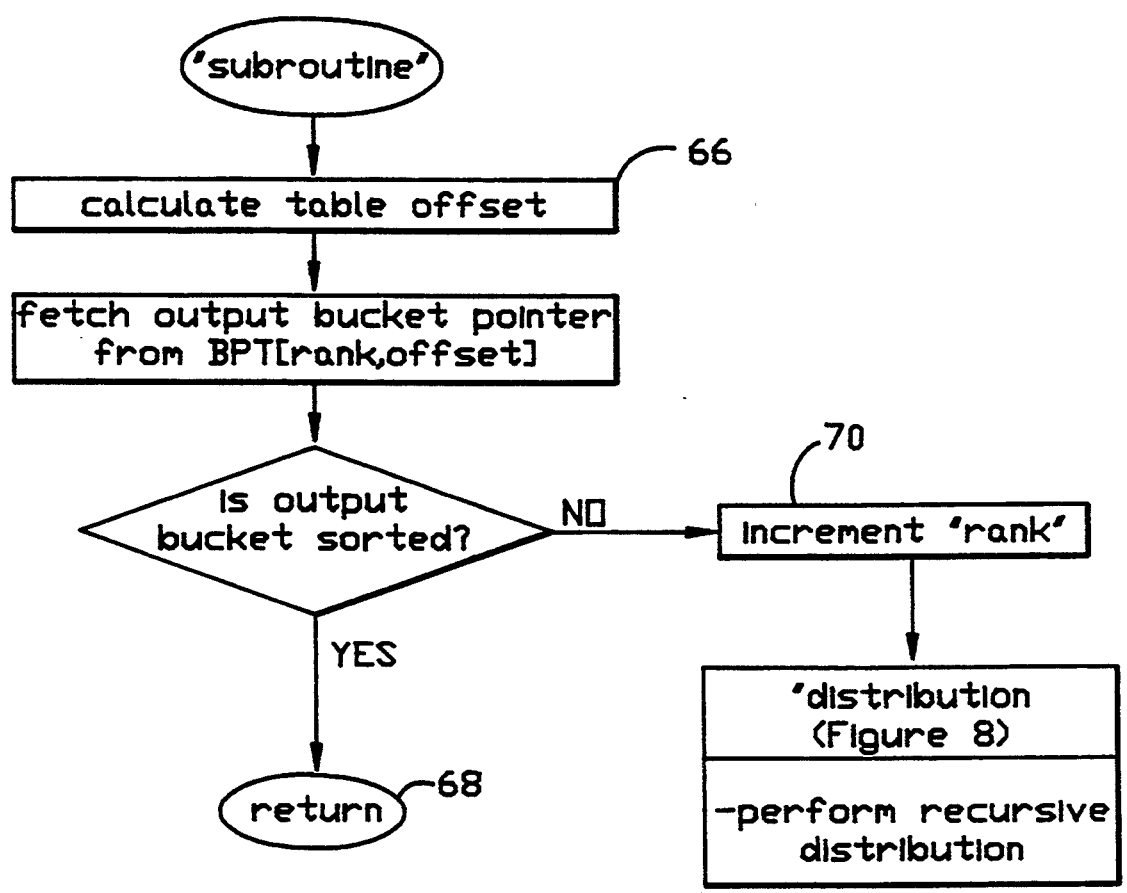
FIG. 9 shows a flow chart illustrating the nested subroutine method of the present invention.

Referring to FIG. 9, note that it is the function of the "subroutine" to determine the next step in the sorting procedure. There is one branch instruction entry in the DBT for each possible key value. The address of the next branch instruction entry in DBT is passed to the "subroutine" as a return address. The key field byte value offset of the non-empty output bucket that causes the "subroutine" to be called can be calculated by subtracting the return address from the DBT beginning address minus one. This process is shown in FIG. 9 as calculation step 66. The non-empty output bucket pointer from BPT is then obtained by indexing this calculated key byte value offset to the BPT.

If the output bucket holds a single RR or the last rank key byte (LSB) has been distributed, then the sort sequence terminates because the RRs in the output bucket are completely sorted. If the RRs are indeed completely sorted, then the records located by the record address pointer field of the RRs are next moved from the input area to the output area in sorted order. Control is then returned by the return 68 to the next branch instruction entry of DBT for processing of the next non-empty output bucket.

If the RRs in the output bucket are not completely sorted, the output bucket is further recursively distributed according to the next ranking key field byte values. A separate DBT and BPT column is used for the distribution of the output bucket. These columns are accessed upon increment of the key field rank (incrementing step 70 in FIG. 9). After all RRs in the output bucket are thereby sorted, control is returned back to the next branch instruction entry of DBT for processing of the next non-empty output bucket.

FIG. 10 provides a comparison of the differences between conventional table scanning procedures and the method of the present invention. FIG. 10 is organized into two columns labeled "no DBT" and "with DBT". The structure accessed in the first column is the BPT alone. The structures accessed in the second column are the BPT and the DBT. FIG. 10 shows the frequency of processor instruction access to each structure for a record file data distribution leading to x non-empty buckets.

There are x STORE instructions executed during a single distribution pass in the first column. In the second column, there are the same number of STORE instructions executed for both the BPT and DBT structures during the single distribution pass. During the empty bucket check, there are (256-x) COMPARE BRANCH instructions executed in the first column. In the second column, there are (256-x) NO-OP instructions executed. During the non-empty bucket check, there are 4x various instructions executed in the first column and 3x various instructions executed in the second column.

Note that the total number of instructions executed for a single distribution pass with no DBT is (512+3x) compared to 5x plus an additional (256-x) NO-OPs when the DBT of the present invention is used. It will be appreciated through brief examination of these results that the method of the present invention is more efficient for all bucket distribution phases that leave one or more empty buckets.

ILLUSTRATIVE PROCEDURAL EXAMPLE

The following example shows how the MSB radix method of the present invention can be applied to sort the eleven records in FIG. 11 having key positions starting at the third byte of the record and a key length of 3 bytes.

The results of the first initialization step are illustrated in FIG. 12A. One DBT and one BPT is allocated for each key byte and a total of 3 DBT and 3 BPTs are allocated. The DBT entries are initialized to contain NO-OPs and the BPT entries are initialized to contain zero. Note that a key byte radix of 256 is assumed in this example, although the eleven key fields shown are limited to decimal digits for illustrative purposes.

The results of the second initialization step for the first input bucket distribution is shown in FIG. 12B. Assuming that each block holds two RRs, the eleven RRs are created in the first input bucket by (a) moving the key field of each record to the input block and (b) appending the corresponding record address pointer.

Note that the input bucket comprises blocks B1–B6 and that the second RR location in block B6 is unused. Note also that the link pointers, exemplified by pointer 72 in block B1, specify the location of the next block within the bucket.

The input bucket in FIG. 12B is next distributed to the plurality of output buckets shown in FIG. 13B. This distribution is based on the MSB of the key field. Referring to FIG. 13A, note that DBT(1) and BPT(1) contain CALL op-codes and bucket pointers in several cells as a result of the first distribution of the input bucket of FIG. 12B.

The RRs from the input bucket are distributed to the different output buckets based on the value of the first MSB. DBT(1) entries are updated with "call subroutine" instructions for the first occurrence of a unique key byte value, and the corresponding BPT(1) entries are updated with the beginning and ending block addresses of non-empty output buckets. The last branch entry of DBT(1) will be used to exist the bucket distribution processing after all RRs are sorted. The resulting contents of DBT(1) and BPT(1) are shown in FIG. 13A as of the completion of the first (most significant) key byte distribution phase.

FIG. 13B shows the contents of the several non-empty output buckets following the distribution of the first input bucket. Bucket(0) contains all RRs having a first MSB key byte value of zero, for instance. Note that bucket(0) requires the two blocks B8 and B14, and that these two block addresses are held in cell BPT(1,0). After all input bucket RRs are distributed, DBT(1) is executed sequentially from the beginning (DBT(1,0)). For empty output buckets or non-occurrence of a key byte value, the BPT(1) entry will be skipped efficiently (without fetch and compare) by the execution of a NO-OP opcode. For non-empty output buckets or occurrences of a unique key byte value, the BPT(1) bucket pointers will be addressed by a predefined subroutine through the execution of a "call subroutine" instruction. Referring to FIG. 13A, upon execution of the first branch instruction entry at DBT(1,0), a "subroutine" (FIG. 9) is executed. The output bucket pointer B8 is fetched from BPT(1,0) and the first entry of DBT(1,0) is reset to NO-OP. At this point the rank index is incremented from (1) to (2).

With the new present rank index of (2), output bucket(0) is next distributed to a new set of output buckets having rank (2). Referring to FIG. 14A, DBT(2) and BPT(2) are used to monitor the distribution of RRs from output bucket(0) of FIG. 13B based on the value of the second rank key field byte.

The RRs of output bucket(0) are then distributed to a new set of (rank 2) output buckets shown in FIG. 14B. As before, the DBT(2) entries are updated with CALL opcodes upon the first occurrence of a unique key byte value and the corresponding BPT(2) entries are updated with the beginning and ending block addresses of the non-empty output buckets. After all RRs in output bucket(0) are sorted, control is returned to the subsequent branch instruction entry DBT(1,1), so that the next non-empty output bucket can be processed. The last branch entry of DBT(2) returns control to the branch instruction entry DBT(1,1) following completion of the sort of output bucket(0).

FIG. 14A illustrates the contents of DBT(2) and BPT(2) following completion of the recursive sort of output bucket(0). FIG. 14B shows the contents of the new (rank 2) output buckets following the distribution of (rank 1) output bucket(0). Bucket(06) contains all RRs with the first most significant key byte value of 0 and the second most significant key byte value of 6, for instance.

After all RRs from output bucket(0) are distributed, DBT(2) is executed sequentially from the beginning (DBT(2,0)). All non-empty rank (2) output buckets are then processed in consecutive order. Upon execution of the branch instruction entry DPT(2,6), the subroutine (FIG. 9) is executed. As before, the output bucket(06) pointer is fetched from BPT(2,6), the entry DBT(2,6) is reset to NO-OP, and the key field rank index is incremented to (3). Output bucket(06) is then distributed to a new set of rank (3) output buckets based on the third ranking key byte value.

The third DBT(3) and BPT(3) are used to distribute the RRs from output bucket(06) to the new output buckets of third rank. The RRs from output bucket(06) are distributed based on the value of the third ranking key byte and the DBT(3) entries are updated with CALL opcodes upon the first occurrence of every unique third rank key byte value. The corresponding BPT(3) entries are then updated with the beginning and ending addresses of the non-empty output bucket.

FIG. 15A shows the contents of DBT(3) and BPT(3) following the distribution of output bucket(06). FIG. 15B shows the contents of the rank (3) output buckets. Because the third ranking key field byte is the LSB, the recursive sort sequence is ended and control is returned to branch entry DBT(2,7) following completion of the distribution of output bucket(06). The last entry of DBT(3) makes this return. All entries in DBT(3) must be executed sequentially before returning to DBT(2,7). All non-empty output buckets are thereby processed in consecutive order.

The execution of DBT(3,0) results in a subroutine call (FIG. 9). As before, the output bucket(060) pointer is fetched from BPT(3,0), entry DBT(3,0) is reset to NO-OP, and the sort sequence ends with output bucket(060) because the LSB key byte has been distributed. This particular sort sequence having ended, record(11) is then located by the record address pointer field of the RR and immediately moved from the input area to a collection bucket in the output area. Control is then returned to the next branch instruction entry DBT(3,1). FIG. 16A shows the contents of the collection bucket following the completion of execution of DBT(3,0).

Following control return to DBT(3,1), the subsequent instruction is executed, resulting in a call to "subroutine". The output bucket(061) pointer is fetched from BPT(3,1), the entry of DBT(3,1) is reset to NO-OP, and the sort sequence is ended at output bucket(061) because the last key byte has been distributed. Record(4) is then located by the RR record pointer and immediately moved from the input area to the collection bucket. Control is then returned to the next branch instruction entry DBT(3,2). FIG. 16B shows the collection bucket contents following the execution of DBT(3,1).

Since all non-empty third rank output buckets have been sorted following the completion of DBT(3,1), the remaining empty third rank output buckets are skipped efficiently by execution of the NO-OP instructions shown in DBT(3) (FIG. 16C). The contents of DBT(2) and DBT(3) are shown in FIG. 16C following completion of the sort of output bucket(06).

Figures 17A, 17B:
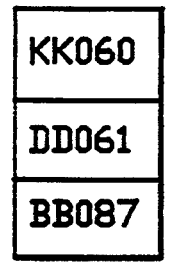
FIGS. 17A and 17B, shows the results of the execution of the second rank DBT of the procedural example.

After falling through the remaining NO-OPs in DBT(3), control is returned to DBT(2,7) by the last branch instruction in DBT(3). Since DBT(2,7) is a NO-OP, it is immediately executed and control proceeds to DBT(2,8), which is a subroutine CALL. The sort sequence ends because bucket(08) in FIG. 14B has a singleton entry and record(2), located by the record address pointer, is immediately moved to the collection bucket. FIG. 17A shows the collection bucket contents and FIG. 17B shows the contents of DBT(2) and DBT(3) following completion of the bucket(08) sort.

The execution of DBT(2) continues at DBT(2,9) and falls through a series of NO-OP instructions to a return branch to DBT(1,1). Upon returning control to the branch instruction entry DBT(1,1) in FIG. 13A, a subroutine CALL is executed causing the recursive distribution of the output bucket(1) seen in FIG. 13B. Output bucket(l) is sorted using DBT(2) and BPT(2) in the same fashion as that discussed in connection with FIG. 14A. Note that these second rank tables are pre-initialized because of the NO-0P substitutions made after each earlier CALL execution. The third rank tables are not used for the bucket(l) sort because both second rank output buckets have singleton entries, which ends each of the respective sort sequences. FIG. 18 illustrates the contents of the collection bucket in the output area following completion of the output bucket(l) sort.

Referring to FIG. 13B, output bucket(5), output bucket(6), output bucket(8) and output bucket(9), are then sorted in consecutive order in the recursive manner described above. Note that output bucket(5) will require a sort to the third rank but all other sort sequences will be ended at the first rank output buckets.

FIG. 19 shows the contents of the collection bucket in the output area following execution of all DBT(1) instructions. Obviously, other embodiments and modifications of the present invention will occur readily to those of ordinary skill in the art in view of these teachings. Therefore, this invention is to be limited only by the following claims, which include all such obvious embodiments and modifications when viewed in conjunction with the above specification and accompanying drawings.

We claim:

1. In a computer-implemented method for distributively sorting a plurality of records by their key fields, said method including steps of recursively distributing and collecting said key fields, each recursion including the steps of (a) comparing each key field against an extrinsic attribute and assigning the key to a same-attribute subgroup, and (b) collecting the subgroups to create an interim or final key order, said recursions being repeated for all subgroups having more than one key field element, the location of all of said subgroups being maintained in a bucket address table of link-listed keys or pointers, wherein the improvement comprises the steps of:

creating a dynamic branching table (DBT) indexed by said bucket address table and initialized by NO-0P (no-operation) instructions;

during each said distribution step, populating said DBT with a CALL instruction linked to said bucket address table for each said subgroup having at least one said key field elements; and during each said collecting step, executing said DBT such that said NO-OP instructions cause the skipping of each said subgroup having no said key field element and said CALL instructions cause the ordering of each said subgroup having at least one key field element.

2. A computer-implemented method for sorting records, said records having a least one key field controlling the sort ordering, said key field having one or more bytes of unique rank, each said byte having a value and all said bytes having the same radix, said method comprising the unordered steps of:

(a) creating a Dynamic Branching Table (DBT) indexed according to said key field byte value and rank, said DBT initially containing a NO-OP instruction in all locations;

(b) creating a Bucket Pointer Table (BPT) indexed according to said key field byte value and rank, said BPT initially containing a null datum in all locations;

(c) creating an input bucket containing all said key fields for said records to be sorted;

(d) distributing the contents of said input bucket to a plurality of output buckets according to the value of said key field byte of a present rank, said distributing step including the steps of:

(1) if said input bucket contains only a single key field, writing said single key field as the most recent entry to a collection bucket;

(2) if said input bucket contains at least two key fields, performing for each said key field in said input bucket, the unordered steps of (i) ascertaining the value of said present rank key field byte for said each key field, (ii) replacing said NO-OP instruction with a CALL instruction in said DBT location corresponding to said value and rank of said present rank key field byte, where said CALL instruction causes said distributing step (d) to be recursively repeated for at least one subsequent key field byte rank and a subsequent input bucket corresponding to an output bucket of said present rank, (iii) writing said each key field to the one of said output buckets corresponding to said present rank key field byte value for said each key field, and (iv) replacing said null datum with the address of said output bucket in the BPT location corresponding to the value and rank of said present rank key field byte; and (3) executing each said DBT instruction having said present rank, whereby said key fields are written in sorted order to said collection bucket.

3. The method of claim 2 wherein the third said creating step (c) further comprises the step of:

creating said input bucket to contain a plurality of Record Representations (RRs), said plurality including the key field for each of said records to be sorted.

4. The method of claim 2 wherein said executing step (d) (3) further comprises the step of:

replacing said CALL instruction in said DBT with a NO-OP instruction subsequent to execution of said CALL instruction.

5. In a bucket sorting method for computing equipment wherein keys, each formed by a plurality of characters, are ordered by successive iterations of processing into any of a number R of buckets, the steps comprising:

writing a CALL instruction into every location within a Dynamic Branch Table associated with any of the different characters of a subgroup of keys encountered during a current iteration through such subgroup, said Dynamic Branch Table being an executable code sequence, and said CALL instruction being a means for recursively sorting said keys in a subsequent said iteration; and executing all said Dynamic Branch Table instructions in sequence after completion of said current iteration.

6. The method of claim 5 wherein:

each said Dynamic Branch Table location is initially filled with a NO-OP instruction, said NO-0P instruction being a means for advancing to a subsequent instruction within said Dynamic Branch Table.

* * * * *

UNITED STATES PATENT AND TRADEMARK OFFICE
CERTIFICATE OF CORRECTION

PATENT NO.   :   5,396,622
DATED        :   March 7, 1995
INVENTOR(S)  :   Lee et al.

It is certified that error appears in the above-indentified patent and that said Letters Patent is hereby corrected as shown below:

Column 12, line 58, replace "NO-OP" with --NO-OP--.

Column 14, line 38, replace "NO-OP" (second occurrence) with --NO-OP--.

Signed and Sealed this

Second Day of May, 1995

Attest:

BRUCE LEHMAN

*Attesting Officer*  *Commissioner of Patents and Trademarks*